UNITED STATES PATENT OFFICE.

RICHARD H. FOX, OF MANCHESTER, OKLAHOMA TERRITORY.

VETERINARY REMEDY.

SPECIFICATION forming part of Letters Patent No. 691,255, dated January 14, 1902.

Application filed October 25, 1901. Serial No. 79,947. (No specimens.)

*To all whom it may concern:*

Be it known that I, RICHARD H. FOX, a citizen of the United States, residing at Manchester, in the county of Grant and Territory of Oklahoma, have invented a new and useful composition of matter to be used for curing saddle and harness galls and other wounds, bruises, sores, and injuries of horses and other animals, of which the following is a specification.

My composition consists of the following ingredients, combined in the proportions stated, viz: Pure air-slaked lime, one pound; common lampblack, one ounce; common sulfur, one-half ounce, and pure old-style indigo, one-fourth ounce. These ingredients are to be thoroughly mixed by agitation.

In using my composition the wound or sore should preferably be first thoroughly cleansed by washing, after which the composition should be applied as a dry powder.

It will be seen that none of the ingredients used are of a poisonous nature and that they are entirely harmless.

What I claim, and desire to secure by Letters Patent of the United States, is—

1. The herein-described composition of matter consisting of pure air-slaked lime; common lampblack, common sulfur, and pure old-style indigo, substantially as described and for the purpose specified.

2. The herein-described composition of matter to be used for curing saddle or harness galls, and other wounds, bruises, sores, and injuries of horses and other animals, consisting of pure air-slaked lime, one pound; common lampblack, one ounce; common sulfur, one-half ounce, and pure old-style indigo, one-fourth ounce, substantially as described and for the purpose specified.

In testimony whereof I affix my signature in presence of two witnesses.

RICHARD H. FOX.

Witnesses:
EMMETT B. ROBERSON,
WILL D. CLARKE.